United States Patent Office 3,113,117
Patented Dec. 3, 1963

3,113,117
HALOCARBOXYLIC ACID CATALYSTS FOR MIXTURES OF ALKYD RESINS AND AMINOPLAST RESINS
Karl R. Gosselink, Gibsonia, Pa., Edward H. Fay, Jr., Berea, Ohio, and Frederick M. Loop, Dearborn, Mich., assignors to Pittsburgh Plate Glass Company, Allegheny County, Pa., a corporation of Pennsylvania
No Drawing. Filed Dec. 21, 1959, Ser. No. 860,705
3 Claims. (Cl. 260—21)

This invention relates to improvements in coating materials such as are used in coating the surfaces of automobile bodies, refrigerators, washing machines, furniture, and other articles, in order to provide hard, tough, chemically resistant and weather resistant finishes, and it has particular relation to improvements in coating materials of the foregoing type which comprise heat-hardenable blends of a heat-convertible amine resin and a compatible alkyd resin.

The use of amine resins and/or alkyd resins in coatings has heretofore been widely recognized. The heat-convertible amine resins, such as are contemplated as components of the blends herein disclosed, are formed by reacting a compound containing two or more —NH$_2$ groups with an aldehyde and are represented by urea resins and melamine resins. General information as to the formation, characteristics of and use of these resins and the blends thereof with alkyd resins are contained in the book entitled Organic Coating Technology, volume 1, by Henry F. Payne, published by John Wiley and Sons (1954). Special emphasis is placed upon chapter 8 entitled "Urea and Melamine-Formaldehyde Resins," pages 326 to 350, to which reference may be made for a further understanding of the resins contemplated herein and which is adopted as a part hereof. The formulae appearing as FIGURE 3, page 331 of said book, provide a close approximation of the structure of a urea-type resin which may be used in the practice of this invention. A corresponding formula for a melamine resin is given in FIGURE 6 on page 336.

The foregoing text indicates that the amine resins, also known as aminoplasts, derived from the reaction of a compound containing —NH$_2$ groups and aldehydes such as formaldehyde, are very hard and resistant to heat and to many solvents and chemicals, but they tend to be brittle and have poor adhesion to materials such as iron or steel. To form useful coatings, it is necessary to blend them with compatible modifiers such as certain polyester resins known as alkyd resins. These are compatible with the amine resins, impart a good capacity for adhesion to metals, and they reduce brittleness.

The alkyd resins have also long been known and are extensively discussed in chaper 7 of the aforementioned text. The information with respect to these resins as disclosed in said chapter is likewise incorporated herein by reference.

Amine resins or aminoplasts, in a heat-hardenable state in which they are soluble in toluene and xylene, can be blended with an alkyd resin and the blends can be formulated into compositions which can be spread upon substrates, such as iron or steel, and baked into an adherent, thermoset state in which they are very hard, tough and flexible, and resistant to solvents, chemicals and weather. These compositions are extensively employed in the coating of automobile and other metallic surfaces.

Although the films obtained from the liquid blends are very good, certain problems do arise in the application and curing thereof. For example, the solutions as heretofore obtained, when applied to a surface, require quite high temperatures of bake, e.g., 225° F. to 350° F., often higher than can readily or economically be attained in commercial installations. Occasionally, however, without adjustments in composition that result in an overly large amount of melamine, they tend to be too soft. The resulting composition therefore deviates from that intended by the formulator producing erratic film properties, such as lack of gloss and poor intercoat adhesion of subsequent coats. Also, the temperature of cure is so high that in many instances substrates or materials associated with the substrates may be damaged. For example, it may be desirable to coat or to retouch articles of manufacture, such as automobiles or bodies thereof, after partial or complete assembly. This is especially true of retouch operations to correct scratches and other blemishes in the finish. At this stage, the assembly may include plastic parts or parts formed of other materials which are subject to discoloration or other forms of deterioration at baking temperatures required for curing the conventional blends of aminoplasts and alkyd resins.

In an attempt to improve these characteristics, it has been customary to add to the liquid blends as curing catalysts, certain acids such as alkyl acid phosphates or p-toluene sulfonic acids, chlorendic acid and others. These, however, are not satisfactory because the solutions of resins containing these catalysts have disadvantages such as poor "pot life," poor color stability and poor weather resistance, that is, the catalyzed mixtures tend to gel or to undergo other forms of change within a short time even when stored at room temperature. They also tend to discolor sensitive pigments, such as lead chromate pigments, molybdate pigments, hydrated ferric oxide and its colloidally dispersed forms known as "gold paste." After a short exposure, films of the blends of amine resins and alkyd resins as herein disclosed, when pigmented with these sensitive pigments and catalyzed with conventional acids, discolor badly. Hydrated ferric oxide pigments tend to fade out. Often the gloss of the films is also poor. In blends containing metallic types of pigment, mottling effects may also be induced by use of conventional catalysts.

When the blends are used to make spot repairs on original films of the same material, it is difficult to produce a satisfactory match of the spot to the original film. It has also been observed that the conventional catalysts tend to produce vehicle degradation, which may in turn produce checking of the cured films.

The present invention comprises the discovery that the disadvantages attending the use of the catalysts conventionally used in the art of curing coating materials which are blends of amine resins and alkyd resins, can in large measure be obviated by replacing conventional catalysts with a halogen substituted dicarboxylic acid or anhydride containing 4 to 5 carbon atoms and being represented by monochloromaleic acid, monobromomaleic acid, dichloromaleic acid, dichloromaleic anhydride, dichlorofumaric acid, dichloroitaconic acid, dichlorosuccinic acid, dichlorosuccinic anhydride, and the like. Mixtures of two or more of these materials may also be employed. Chlorine in the foregoing acids and anhydrides may be replaced by bromine or other halogin atom/s.

In order to promote the dispersion of the curing catalyst with the resins in the blends, it is desirable to dissolve the catalyst in a suitable solvent. Preferred solvents comprise ketones such as methyl ethyl ketone, methyl isobutyl ketone, isophorone, cyclohexanone, and ethers such as diethyl ether, and the like. Alcohols such as butyl alcohol tend to react with dichloromaleic acid and its anhydride, but may be used in those instances in which there is no appreciable period of storage for the catalyst solution.

These halogenated dicarboxylic acids can be incorporated into the blends of the aminoplasts and the alkyd resins in small amounts, e.g., about 0.015 to about 5 percent by weight based upon the resin blend, to provide compositions which are of improved pot life and which when spread as films will cure rapidly at moderate temperatures to form hard, tough, chemically resistant and weather resistant films having good adhesion to the substrates such as iron or steel, or original organic coating. The catalyzed coatings have good color stability even when they contain sensitive pigments, such as colloidally dispersed hydrated iron oxide and others, which tend strongly to fade or otherwise to discolor in blends which are catalyzed with materials conventionally employed in the foregoing blends of resins.

Aminoplast resins which can be blended with alkyd resins and the blends of which can then be catalyzed with the foregoing halogen substituted dicarboxylic acids and/or anhydrides have already been referred to. They are reaction productions of a compound containing a plurality of —NH$_2$ groups and an aldehyde or a substance acting as an aldehyde.

Compounds of the first type are most commonly represented by urea, melamine, guanamine and benzoguanamine, and compounds of the second type are commonly represented by formaldehyde, benzaldehyde, or materials which react in situ with the amino groups to give active N-methylol groups, such as

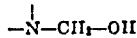

In the reaction, the aldehyde or its equivalent is usually dissolved in an alkanol, such as butyl alcohol, and at least a part of the N-methylol groups are converted into

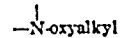

groups as represented by the formula:

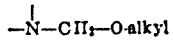

These groups are distributed as side chains in the resin molecules. Butanol may be replaced by other monohydric aliphatic alcohols containing from about 3 to about 8 carbon atoms and being represented by propyl alcohol, isopropyl alcohol, butyl alcohol, isobutyl alcohol, pentyl alcohol, hexyl alcohol, and octyl alcohol. All of these are primary or secondary alcohols.

The equivalent weights per hydroxy methyl group and alkoxymethyl group will vary dependent upon the molar ratios or the aldehyde and the alkanol with respect to each other. In general, about 2 to 6 moles of aldehyde and 2 to 8 moles of alkyl alcohol per mole of amine compound will be used. Greater quantities of aldehyde and alkyl alcohol could be used, but are removed at the conclusion of the reaction and seldom are advantageous.

The above discussed resins contain

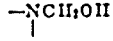

groups to adapt the resins to cure to a thermoset, insoluble state, and they all contain

groups, wherein the moiety designated as "alkyl" ordinarily contains from 3 to 8 carbon atoms. The ones contemplated herein are soluble in aromatic hydrocarbons, such as toluene, and are compatible with many alkyd resins and they can be cured by application of baking temperatures to a hard, thermoset state. Many aminoplast resins which can be utilized are available commercially.

The following examples are illustrative of the preparation of amino resins which are suitable for use in the practice of the invention.

EXAMPLE A

In this example, the amino compound was melamine. Formaldehyde was employed as a 40 percent solution in butanol and phthalic anhydride was employed to catalyze the reaction. The charge comprised:

| | Parts by weight |
|---|---|
| Melamine | 280 |
| Butyl alcohol solution of formaldehyde (40 percent formaldehyde) | 1000 |
| Phthalic anhydride (catalyst) | 0.278 |

To the foregoing charge was added 178 parts by weight of additional butyl alcohol. The charge was reacted by refluxing until a solution of a solids content of 60 percent in a solvent, which was a mixture of 21 parts by weight of butanol and 19 parts by weight of xylene, was of a Gardner-Holdt viscosity of R. At the conclusion of the period of refluxing, butanol was distilled and xylene was added to give a solution of 60 percent concentration in the foregoing mixture of butanol and xylene. The resin was compatible with alkyd resins as disclosed hereinafter and could be baked to a hard, thermoset state.

EXAMPLE B

In this example, a charge was made up comprising:

| | Parts by weight |
|---|---|
| Melamine | 1120 |
| Butyl alcohol-formaldehyde (40 percent) solution of formaldehyde | 4000 |
| Benzoic acid (catalyst) | 6.6 |

To the foregoing charge was further added 712 parts by weight of butyl alcohol. The mixture was refluxed to evolve water and at the end of the refluxing period, butanol was evaporated and xylene was added to provide a solution of 60 percent solids in 21 parts by weight of butanol and 19 parts by weight of xylene. This solution had a Gardner-Holdt viscosity of R. This resin was also compatible with alkyd resins and could be baked to a hard, thermoset state.

EXAMPLE C

This example is illustrative of the preparation of a urea resin which is adapted for blending with alkyd resins in order to provide a mixture, the cure of which can successfully be catalyzed with the catalysts of the invention.

The formaldehyde is employed in a proportion of from 2 to 4 moles per mole of urea, the urea and formaldehyde being dissolved in an aliphatic monohydric alcohol containing about 3 to 8 carbon atoms.

Initially, the reaction is conducted on the alkaline side. During this stage, the urea reacts to provide

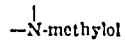

groups. Subsequently, the pH value is changed to the acid side in order to promote condensation of the methylol groups with aliphatic alcohols in order to provide

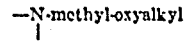

groups and to effect condensation between N-methylol groups.

In a specific example, a reaction mixture is provided comprising 1 mole of urea and 2.22 moles of formaldehyde as a 40 percent solution in butanol. This solution comprises about 50 percent of reactants considered as solids in the butyl alcohol. The mixture is refluxed at a pH of 8.5 for about 1 hour. The solution is then acidified to a pH in a range of about 3.5 to 4 and refluxing is further continued until a temperature of 229° F. is reached. Subsequently, butanol is distilled off until a temperature of 250° F. is attained, at which point the heat is shut off. The mixture is cooled and thinned with xylene to a 50 percent concentration, at which point the solvent system comprises about equal parts of butanol and xylene and the Gardner-Holdt viscosity is about X.

The acid value is approximately 0.5. The resultant resin solution contains adequate

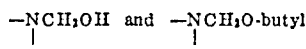

groups and is suitable for blending with alkyd resins in accordance with the provisions of the present invention.

In forming alkyd resins or polyesters which can be used for blending with liquid amine resins to form mixtures as herein disclosed, the cure of which can be catalyzed with anhydrides of halogen substituted dicarboxylic acids, various polyols can be used. These include glycerol, pentaerythritol, dipentaerythritol, mannitol, sorbitol, trimethylolethane, trimethylolpropane, 1,3,6-hexanetriol, and others. These are usually employed in amounts approximating, or somewhat exceeding equivalency with respect to the acid component.

Usually the acid component comprises a mixture of dibasic and monobasic acids. The dibasic acids are represented by such dicarboxylic acids as phthalic acid, isophthalic acid, terephthalic acid, tetrachlorophthalic acid, tetrabromophthalic acid, carbic acid, chlorendic acid, fumaric acid, maleic acid, itaconic acid, adipic acid and sebacic acid, or combinations of these acids. The term "acid" also includes the anhydrides thereof where they exist.

It is also preferable to include a substantial amount of a monocarboxylic acid in the alkyd resin. Appropriate monocarboxylic acids comprise saturated aliphatic acids containing about 8 to about 18 carbon atoms, such as lauric acid, palmitic acid, stearic acid, hydroxy stearic acid; semi-saturated acids such as oleic acid and ricinoleic acid, pelargonic acid, decanoic acid, myristic acid, cyclohexylcarboxylic acid, 2-ethylhexoic acid, acrylic acid, methacrylic acid, abietic acid, benzoic acid, p-tertiarybutylbenzoic acid, toluic acid, and others. Usually the two types of acids (dicarboxylic acid and monocarboxylic acid) are employed in about equimolar amounts, but these ratios can be varied if desired. Monocarboxylic acids low in or free of functional unsaturation, such as ethylenic groups, are presently preferred. Pure acids or mixtures of two or more thereof with each other may be employed. Such mixtures of monobasic acids as are obtained from natural sources, such as glycerides represented by coconut oil, soya oil, corn oil, cotton seed oil, are examples of useful mixtures of useful acids. Acids distilled from tall oil may be employed.

Mixtures of aliphatic monocarboxylic acids, such as coconut oil acids, and about 5 to 30 percent by weight of an aromatic monocarboxylic acid, such as benzoic acid, may be used as the monocarboxylic acid component of the resin.

The fatty acids need not necessarily be employed as free acids, but may be employed as partial esters of a polyol such as glycerol, pentaerythritol, or other polyhydric alcohol. Such partial esters will average about 2 available hydroxyl groups per molecule and they are reacted by esterification with a dicarboxylic acid such as herein disclosed to provide an alkyd resin.

The sums of the acids usually are employed in slightly less (e.g., 1 to 10 molar percent) than molar equivalency with respect to the polyhydric alcohol. The two types of acids (dicarboxylic and monocarboxylic) are also most often employed in approximately equal moles. However, variations in this respect are also contemplated. The range may be, for example, about 30 to 70 molar percent of one of the said acids, the remainder being the other.

The following constitutes a typical alkyd resin which may be blended with the amine resins in the practice of the invention.

EXAMPLE D

In the resin, the monobasic acids are from coconut oil, glycerine is the polyol and phthalic anhydride is the dibasic acid component. The reaction charge is proportioned to provide an ester product in which the coconut oil fatty acid glycerides constitute 41 percent, the phthalic acid glycerides constitute 54.9 percent, and the glycerine is present in an amount of 4.1 percent by weight excess. The charge from which the polyester is formed is mixed with an azeotroping agent; namely, about 5 percent by weight xylene, and the mixture is refluxed to an acid value in a range of about 2 to 10, the charge being brought to a temperature of 400° F.

The alkyd resin is then diluted to about 65 percent solids content in toluene to provide a solution of a Gardner-Holdt viscosity of X-Y. Obviously, the proportions of toluene could be increased or decreased to vary the viscosity to any desired value.

If further reduction of the viscosity is desired without excessive increase of the solvent ratio, toluene may be in part replaced by butanol, a good solvent mixture being approximately 88 percent of toluene and 12 percent of butanol.

It will be manifest that in the preparation of the polyesters or alkyd resins, the polyhydric alcohol component may be replaced by any of the others previously mentioned. The dibasic acid (phthalic acid) may be replaced by any of the other dibasic acids which have been listed. Likewise, the monobasic acids (coconut oil fatty acids) may be replaced by other monobasic acids from those previously listed.

Solvents for the resins comprise alcohols containing from about 3 to about 8 carbon atoms and being represented by propyl alcohol, isopropyl alcohol, butyl alcohol, amyl alcohol, nonyl alcohol, octyl alcohol, and the like. Likewise, aromatic hydrocarbons such as xylene and toluene, and aliphatic hydrocarbons such as the aliphatic naphthas, ketones such as methyl ethyl ketone, methyl isobutyl ketone, cyclohexanone, isophorone, esters such as isopropyl acetate, butyl acetate, amyl acetate, nonyl acetate, phosphates such as tributyl phosphate, and chlorinated hydrocarbons are useful. These are employed in amounts to give desired viscosity to the blends of resins. Mixtures of two or more of these solvents are often employed to dissolve the resins.

The blends of aminoplast resins and alkyd resins catalyzed with halogen substituted dicarboxylic acids as herein disclosed, may be employed as coating media in the form of clear solutions. In most instances, however, it is preferred suitably to pigment them with conventional pigments, such as are well-recognized in the art. Suitable pigments may be selected from the following class:

Titanium dioxide
Aluminum powder
Carbon black
Lamp black
Ferric oxide (Fe$_2$O$_3$)
Ferrosoferric oxide
Ferric hydroxide [colloidally dispersed hydrated Fe(OH)$_3$]
Phthalocyanine blue
Phthalocyanine green
Prussian blue
Vat pigments, such as:
    Vat reds
    Vat yellows
    Vat oranges
Molybdate pigments
Chrome orange
Chrome yellow
Chromium oxide
Chromium hydroxide
Lithopone
Calcium carbonate
Zinc sulfide
Zinc oxide
Antimony oxide
Cadmium sulfide Cadmium selenide
Raw umber
Burnt umber
Raw sienna
Burnt sienna
Chrome green
Chrome oxide
Chrome hydrate
Indo blue
Indanthrone blue
Indanthrene blue
Indanthrene red
Indanthrone red Obviously, these pigmentary materials are merely representative and others may be employed if so desired. Some, though not all, of these pigments are subject to serious discoloration when used in blends which are catalyzed with conventional catalysts such as have heretofore been employed and being represented by the alkyl acid phosphates and the toluene sulfonic acids. Typical examples of pigments which tend to discolor in the presence of conventional catalysts comprise colloidally dispersed hydrated $Fe(OH)_3$, chrome orange, chrome yellow, chrome green, molybdate pigments, and the like.

The pigments are usually added in amounts to give a desired degree of opacity or color to the mixture.

In forming the blends of the alkyd resin and the amine resin, various proportions of the two resins are contemplated; for example, the amine resin may constitute from about 5 to about 50 percent by weight of the mixture of the two resins, although this ratio is not critical.

The solution of the halogen substituted acid or anhydride preferably constitutes about 0.015 to about 5 percent or more based upon the total of the two resins in the mixture. It will be apparent that enough of the solution of the catalyst is employed to provide an amount of catalyst within the foregoing range.

In addition to the catalyst, the blend of the alkyd resin and the amine resin may also include various added vehicular agents such as plasticizers represented by epoxidized oils, so-called chemical plasticizers such as triphenyl phosphate, tricresyl phosphate, dicyclohexyl phthalate, butylbenzyl phthalate, and others.

EXAMPLE I

This example is illustrative of the use of dichloromaleic anhydride as a catalyst of curing in an unpigmented resin composition containing an alkyd resin and an aminoplast resin. In the example, the amine resin was prepared in accordance with the provisions of Example A. The alkyd resin was a conventional polyester of phthalic anhydride and glycerol modified by coconut oil acids and was prepared in accordance with Example D.

Tests were conducted as follows:

Test 1

In this test alkyd resin without added amine resin was employed, the resin being dissolved in xylene. The catalyst was dichloromaleic anhydride as a 13 percent solution in methyl isobutyl ketone. The catalyzed blend comprised:

| | Parts by weight |
|---|---|
| Alkyd resin per Example D | 22 |
| Xylene | 11 |
| Solution of catalyst | 1 |

A like solution with the exception of the omission of the catalyst, was also made up. Test panels of glass were coated with the solutions and the panels were baked. The panels containing the dichloromaleic anhydride as a catalyst were baked for 20 minutes at 180° F., whereas the control panel containing no dichloromaleic anhydride was baked for 30 minutes at 250° F. The films obtained in all instances were sticky and substantially uncured. This test indicates that the alkyd resins that do not contain amine resin are substantially inactive with respect to dichloromaleic anhydride as a catalyst.

Test 2

In this test compositions were made up comprising polyester as in Test 1 together with melamine resin. One solution was made up comprising the two resins in a solution containing xylene as a solvent. This solution without catalyst was employed as a control. The composition was as follows:

| | Parts by weight |
|---|---|
| Alkyd resin per Example D | 15 |
| Melamine resin (prepared in accordance with Example A) | 6.5 |
| Xylene solvent | 11 |

This material was spread as a film upon test panels. One set of panels was baked at 250° F. for 30 minutes. The resultant films were of a Sward hardness of 20. The second set of panels was baked for 20 minutes at 180° F. The resultant films were sticky and substantially uncured.

Test 3

A sample like that in Test 2 was made up, but containing one part by weight of a 13 percent solution of dichloromaleic anhydride in butyl alcohol. This solution was spread upon one set of test panels and one set of panels was baked at 250° F. for 30 minutes. The resultant films were of a Sward hardness of 28.

Like panels when baked at 180 F. for 20 minutes provide films which are not sticky and which are of a Sward hardness of 12. The dichloromaleic anhydride is effective in the blend even under these mild curing conditions.

Test 4

Further compositions were made up comprising:

| | Parts by weight |
|---|---|
| Melamine resin prepared in accordance with Example A | 23 |
| Xylene | 10 |
| Dichloromaleic anhydride as a 13 percent solution in butyl alcohol | 1 |

Films of the composition were spread upon glass test panels and one set thereof was baked at 250° F. for 30 minutes, while a second set thereof was baked at 180° F. for 20 minutes. The resultant films were respectively of Sward hardnesses of 66 and 18.

In a like test in which the catalyst was omitted, films baked at 250° F. for 30 minutes gave a Sward hardness of 14. The mixture did not cure at a temperature of 180° F. over a period of 20 minutes.

Test 5

In this test the amine resin was a thermosetting urea-formaldehyde resin. A solution of this material was made up comprising:

| | Parts by weight |
|---|---|
| Urea resin as per Example C | 28 |
| Xylene (solvent) | 5 |
| Catalyst solution (same as above) | 1 |

These materials were spread upon panels of glass. One set of panels was cured at 250° F. for 30 minutes. The resultant films were of a Sward hardness of 60. The other panels were cured at 180° F. for 20 minutes to give films of a Sward hardness of 24.

Test 6

In this test blends were prepared each comprising 15 parts by weight of an alkyd resin which substantially corresponds to that of Example D, the solvent employed being a mixture of 88 parts by weight of xylene and 12 parts by weight of butanol; the alkyd resin being blended with 8 parts by weight of a solution of a urea resin, which was the same as that of Example C. To one of the blends was added 1 part by weight of dichloromaleic anhydride solution, as disclosed in Test 1, and 9.5 parts by weight of xylene.

To a second blend was added 10.5 parts by weight of xylene and no catalyst. The samples were spreads as films upon glass panels. One set of films of these two materials was subjected to baking at 250° F. for 30 minutes, while a second set was subjected to baking at 180° F. for 20 minutes. The Sward hardnesses of the films are tabulated as follows:

|  | Sward Hardness | |
|---|---|---|
|  | Catalyzed | Uncatalyzed |
| 30 minutes at 250° F. | 36 | 16 |
| 20 minutes at 180° F. | 16 | 4 |

It will be observed that in each instance the films containing the dichloromaleic anhydride as a catalyst were much harder and more satisfactorily cured than the films from the material containing no catalyst.

EXAMPLE II

This example is illustrative of the preparation of a pigmented blend of melamine resin and an alkyd resin in which the blend is catalyzed with dichloromaleic anhydride. In the preparation of the pigmented blend, a paste was prepared comprising:

|  | Pounds |
|---|---|
| TiO$_2$ | 164 |
| Alkyd resin solution (prepared in accordance with Example D) | 41 |
| Xylene | 69 |
| Total | 274 |

To this paste are added 10 pounds of a further paste comprising:

|  | Pounds |
|---|---|
| Phthalocyanine blue | 1 |
| Alkyd resin solution (as in Example D) | 1 |
| Xylene | 8 |
| Total | 10 |

The mixture is tinted with 1.5 pounds of a paste comprising:

|  | Pounds |
|---|---|
| Hydrated iron oxide | 0.5 |
| Alkyd resin solution (as per Example D) | 0.5 |
| Xylene | 0.5 |
| Total | 1.5 |

The foregoing pigment pastes were incorporated with 320 pounds of a 65 percent solution in toluene of alkyd resin prepared in accordance with the provisions of Example D.

Melamine-formaldehyde resin prepared in accordance with the provisions of Example B was added as a 60 percent solution in a mixture of xylene and butanol in an amount of 122 pounds of solution, and to this solution was further added 82 pounds of a solution of butylated melamine-formaldehyde resin, sold commercially as Plaskon-3382, as a 50 percent solution in equal parts of xylene and butanol. The mixture was diluted to a viscosity of 32 as determined at 77° F. in a No. 4 Ford cup by means of a solution comprising:

|  | Pounds |
|---|---|
| Butyl alcohol | 13 |
| Toluol | 131 |

The resultant composition weighed about 953.5 pounds per 100 gallons and contained 56.5 percent of total solids, the rest being volatile material.

In the solids the pigment comprised 31 percent by weight of the mixture, the rest being the resin vehicle. The vehicle was composed of 68 percent by weight of alkyd resin, the rest being melamine resin.

This mixture was catalyzed by the addition of 3 percent of a 13 percent solution of dichloromaleic anhydride in methyl isobutyl ketone. There was nothing significant in the proportions of the solvent in the catalyst solution other than that it accords well with commercial practice in the formation of solutions of catalysts for use in the curing of blends similar to those herein disclosed.

The catalyzed paint composition was stable and could be stored for considerable periods of time without any substantial tendency prematurely to gel or otherwise deteriorate. The pigmented compositions could be spread upon surfaces of materials, including iron and steel, sanded or unsanded, primed or unprimed, and baked at an appropriate temperature to provide hard, durable films. When baked at the relatively low temperature of 180° F. for 20 minutes, the films cured to a Sward hardness of 12–16.

The normal curing schedule for the pigmented compositions is 30 minutes at 250° F., at which temperature the films bake to a Sward hardness of 28–30. An appropriate curing schedule for many retouch jobs is 20 minutes at 180° F., at which temperature films of the material will bake to a Sward hardness of 12–16 which is reasonable for many retouch jobs. The temperature and time schedule can readily be maintained without damage to most other films upon the substrate, or accessories of heat-sensitive materials associated with the substrate.

EXAMPLE III

This example is illustrative of the use of a mixture of melamine resin and urea resin in the formulation of blends of aminoplast and alkyd resins in the practice of the present invention. In the example, a titanium dioxide dispersion was prepared as in Example II, and to this dispersion was added a paste of phthalocyanine blue and also a paste of ferric hydrate, likewise corresponding to that described.

The paste composition comprised:

|  | Pounds |
|---|---|
| TiO$_2$ dispersion | 274 |
| Phthalocyanine blue paste | 10 |
| Ferric hydrate paste | 1.5 |

The pigment pastes were incorporated with 320 parts by weight of alkyd resin solution comprising 65 percent solids in toluene. To the mixture were added 122 parts by weight of butylated melamine-formaldehyde resin prepared as in Example A and containing 60 percent solids in a mixture of equal parts of butanol and xylene. The mixture was further blended with 82 pounds of a 50 percent solution in butanol and xylene, of butylated urea-formaldehyde resin. The mixture was further brought to desired viscosity by the addition of 13 pounds of butyl alcohol and 131 pounds of toluol. The final enamel had a weight of 954 pounds per 100 gallons and had a total solids content of 56.5 percent by weight, the solids being 31 percent pigment and 69 percent resin blend. In the blend the alkyd resin constituted 68 percent, the melamine 19 percent and the urea resin 13 percent. The mixture was catalyzed with 3 percent by weight of a 13 percent solution of dichloromaleic anhydride in methyl isobutyl ketone.

This pigmented mixture could be used for coating surfaces of iron, steel, other previously cured organic coatings, and other materials, and could be baked by schedules such as are employed in Example II, to provide hard, durable and adherent films.

EXAMPLE IV

This example illustrates the use of dichloromaleic anhydride as a catalyst in an enamel composition which contains a blend of an aminoplast and alkyd resin and colloidally dispersed hydrated iron oxide, a pigment which is quite sensitive to discoloration in blends of aminoplasts and alkyd resins containing mixtures of mono- and di-n-butyl acid phosphates as a catalyst. In preparing the pigmented blend a paste is initially made up comprising:

*Paste a*

| | Pounds |
|---|---|
| Flake aluminum | 8.5 |
| Alkyd resin | 11 |
| Toluene | 11.5 |

A colloidal dispersion of hydrated iron oxide is also made up comprising:

*Paste b*

| | Pounds |
|---|---|
| Hydrated iron oxide | 11 |
| Alkyd resin | 5.5 |
| Hydrocarbon solvent | 15.5 |

The solvent was a hydrogenated aromatic naphtha, boiling in a range of about 187° C. to about 200° C.

A further color dispersion was made up comprising:

*Paste c*

| | Pounds |
|---|---|
| Vat orange | 2 |
| Alkyd resin solids | 8 |
| Hydrocarbon solvent (same as in Paste *b*) | 8 |

A still further dispersion comprising:

*Paste d*

| | Pounds |
|---|---|
| Vat yellow | 3 |
| Alkyd resin | 1 |
| Toluene | 1.5 | was made up. In these pastes the alkyd resin was the same as that of Example D.

The foregoing pastes were blended with:

| | Pounds |
|---|---|
| Alkyd resin (the same as that of Example D) | 368 |
| Melamine-formaldehyde resin solution (essentially corresponding to that of Example A) | 109.5 |
| Xylene | 55 |
| Butanol | 55 |

The mixture was still further diluted with 27 pounds of butyl alcohol and 129 pounds of hydrocarbon solvent, which was a hydrogenated aromatic hydrocarbon boiling in a range of 135° C. to 180° C., to provide 100 gallons of enamel composition which was of a total solids of 47 percent and 53 percent volatiles. The total solids comprised 5.5 percent of pigment and 94.5 percent of resin. In the solids the alkyd resin constituted 70 percent and the melamine resin 30 percent. The enamel composition was of a viscosity of 35 on a No. 4 Ford cup at 77° F. The blend was quite stable and films thereof spread upon steel panels baked to a Sward hardness of 28 at 250° F. in a period of 30 minutes.

To a portion of the blend, 3 percent by volume of dichloromaleic anhydride solution (13 percent dichloromaleic anhydride in methyl isobutyl ketone) was added. Films of the resulting composition were baked for 20 minutes at 180° F. The resultant films were of good color and the stability of the colors was good and there was but slight change upon exposure of the films.

Corresponding films of the same enamel, except for the substitution of mono- and di-n-butyl acid phosphate as a catalyst, exhibit substantial discoloration when the films are formed and there is further discoloration upon weathering of the films.

EXAMPLE V

In this example a pigmented blend of a melamine resin and an alkyd resin was prepared in accordance with the provisions of Example II, 3 percent by weight based upon the blend of chloromaleic acid being substituted for dichloromaleic anhydride. A glass panel was coated with the catalyzed material and was cured by baking at 180° F. for 20 minutes. The cured film had a Sward hardness of 12 and a recoat of the same film when cured by a like schedule had a similar hardness.

EXAMPLE VI

In this example dichlorosuccinic anhydride was employed as a catalyst in the curing of a pigmented blend corresponding to that of Example II, except that the dichloromaleic anhydride catalyst was replaced by an equal weight of dichlorosuccinic anhydride. The samples could stand overnight or longer without substantial increase of viscosity.

Samples of this material were spread as films upon glass panels and baked at 180° F. for 20 minutes. The Sward hardness of the resultant films was 10. In a similar material in which the catalyst was omitted, the same baking schedule resulted in films which were of a Sward hardness of only 2.

Similar tests were also conducted with and without dichlorosuccinic anhydride upon a second set of films, but with a baking schedule of 250° F. for 30 minutes. The films containing no catalyst baked to a Sward hardness of 16, while the films containing the dichlorosuccinic anhydride in an amount of 3 percent by weight based upon the vehicle solids had a Sward hardness of 24. The same composition baked for 20 minutes at 180° F. gave a Sward hardness of 10.

Dibromo- and monobromomaleic anhydride or dibromo- or monobromosuccinic anhydride may be substituted for the corresponding dichloro- and monochloro compounds in the foregoing examples with good results.

For purposes of comparison, a pigmented blend which was also the same as that of Example II was prepared, the catalyst being 3 percent by weight based upon the resin components of chlorendic anhydride (the acid anhydride resulting from the reaction of hexachlorcyclopentadiene and maleic anhydride). The catalyzed blend when spread as a film upon glass and baked for 20 minutes at 180° F. gave a Sward hardness of 6. The material was not a good catalyst because exposed films catalyzed with chlorendic acid anhydride showed poor durability.

In still a further example a pigmented blend corresponding to that of Example II, except that the dichloromaleic anhydride of the former example was replaced by tetrahydrophthalic anhydride, was spread as a film upon a glass panel and baked for 20 minutes at 180° F. This blend gave films of a Sward hardness of only 2.

For purposes of comparing the stability of pigmented blends containing dichlorosuccinic anhydride with that of a blend containing a mixture of mono- and dibutyl acid phosphate (a conventional catalyst for curing the blends) a set of samples was prepared, one being catalyzed with dichlorosuccinic anhydride and the second with 4.5 percent of the mono- and dibutyl acid phosphate mixtures. The mixture containing the dichlorosuccinic anhydride when allowed to stand overnight became only slightly bodied and was a comparatively stable mixture. In contrast, the mixture containing the mono- and dibutyl acid phosphate when allowed to stand overnight became heavily bodied and obviously was of quite poor stability.

In the foregoing example, the use of dichlorosuccinic anhydride is disclosed. The dichlorosuccinic anhydride can be replaced with trichlorosuccinic anhydride and/or tetrachlorosuccinic anhydride in amounts ranging from about 0.015 to about 5 percent by weight based upon the resin blend which is to be catalyzed.

The present invention also contemplates the use of blends of dichloromaleic anhydride, dichlorosuccinic anhydride, monochloromaleic anhydride, and other halogenated dicarboxylic acids within the purview of the present invention. The invention further contemplates the mixing of the halogenated dicarboxylic acids herein disclosed with acid phosphates such as mono- and dibutyl phosphate, phosphoric acid, para-toluene sulfonic acid, and other acid catalysts which have heretofore been employed.

Although specific examples of the invention have been set forth hereinabove, it is not intended to limit the invention thereto, but to include all of the variations and modifications falling within the scope of the appended claims.

We claim:

1. A resinous composition comprising an aminoplast resin which is a condensation product of an amine containing an $NH_2$ group and an aldehyde, a compatible alkyd resin, the aminoplast resin being present in an amount of about 5 percent to about 50 percent by weight based upon the total weight of the aminoplast resin and the alkyd resin, and a catalytic amount of a catalyst which is dichloromaleic anhydride.

2. A resinous composition comprising an aminoplast resin which is a condensation product of an amine containing an $NH_2$ group and an aldehyde, a compatible alkyd resin, the aminoplast resin being present in an amount of about 5 percent to about 50 percent by weight based upon the total weight of the aminoplast resin and the alkyd resin, and a catalyst which is dichloromaleic anhydride, in an amount of about 0.015 percent to about 5 percent by weight of the resinous components.

3. A resinous composition comprising an aminoplast resin which is a condensation product of an amine containing an $NH_2$ group and an aldehyde, a compatible alkyd resin, the aminoplast resin being present in an amount of about 5 percent to about 50 percent by weight based upon the total weight of the aminoplast resin and the alkyd resin, and a catalytic amount of a catalyst compound which is an anhydride of a dicarboxylic acid selected from the group consisting of dichloromaleic anhydride, dichlorosuccinic anhydride and monochloromaleic anhydride, the amount of said dicarboxylic anhydride being within a range of 0.015 percent to 5 percent by weight of the resinous components.

References Cited in the file of this patent

UNITED STATES PATENTS

| | | |
|---|---|---|
| 2,523,470 | Kropa et al. | Sept. 26, 1950 |
| 2,801,226 | Wohnsiedler | July 30, 1957 |
| 2,918,452 | Kun et al. | Dec. 22, 1959 |